United States Patent [19]

Van Dongen et al.

[11] Patent Number: 4,953,207
[45] Date of Patent: Aug. 28, 1990

[54] ELECTRONIC TELEPHONE SET

[75] Inventors: Frederik Van Dongen, Eindhoven; Philippe B. E. Jouen, Caen; Petrus J. M. Sijbers, Eindhoven, all of Netherlands

[73] Assignee: U.S. Philips Corporation, New York, N.Y.

[21] Appl. No.: 427,440

[22] Filed: Oct. 24, 1989

[30] Foreign Application Priority Data

Nov. 30, 1988 [NL] Netherlands ............ 8802945

[51] Int. Cl.$^5$ ............................................. H04M 1/00
[52] U.S. Cl. .................................... 379/395; 379/413; 379/387
[58] Field of Search ............... 379/395, 413, 387, 391, 379/392, 399

[56] References Cited

U.S. PATENT DOCUMENTS 4,748,664 5/1988 Blomley ................ 379/395

Primary Examiner—Jin F. Ng
Assistant Examiner—Jhancy Hugustus
Attorney, Agent, or Firm—Bernard Franzblau

[57] ABSTRACT

An electronic telephone set which includes first and second connection points for a telephone line and a transmission circuit having a send output stage including a first transistor whose first main electrode is coupled to the first connection point by means of a first resistor. The telephone set includes a supply circuit for peripheral circuits. The supply circuit has a first output terminal coupled to the first main electrode of the first transistor and has a second transistor whose first main electrode is coupled to the second connection point and whose second main electrode is coupled to the second output terminal of the supply circuit. This circuit includes an operational amplifier whose output is coupled to the gate electrode of the second transistor. the set also includes a first voltage source connected between the first main electrode of the second transistor and a first input of the operational amplifier. In order to make a more efficient use of the available line current in long telephone lines, the second main electrode of the first transistor is coupled to the second input of the operational amplifier and, by means of a second resistor, to the second connection point.

11 Claims, 1 Drawing Sheet

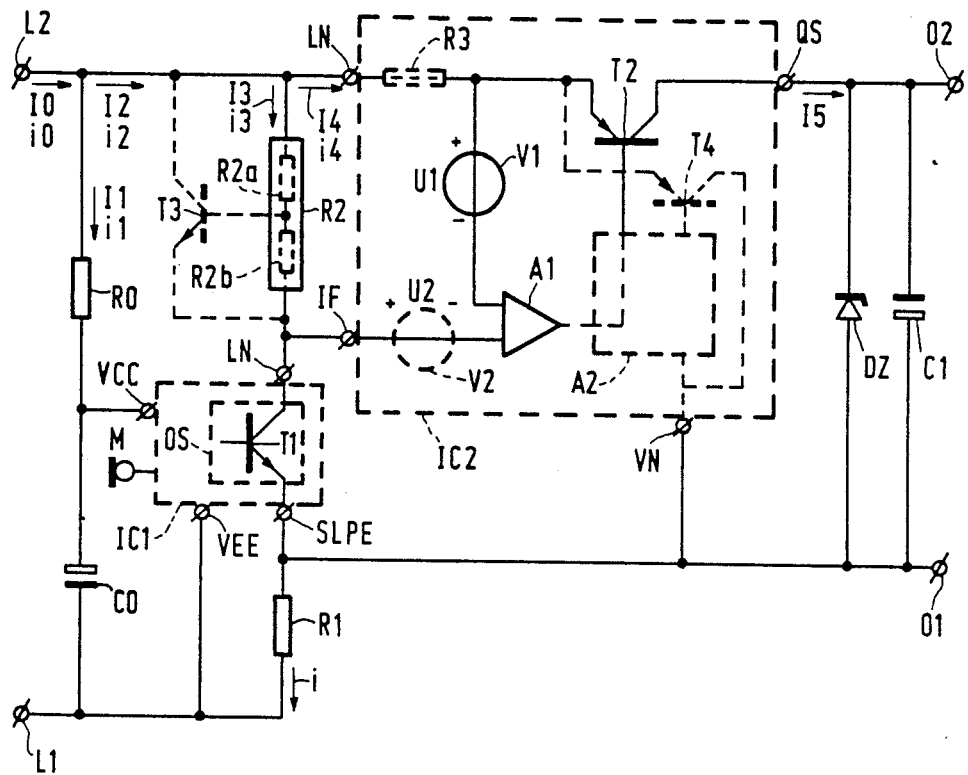

ELECTRONIC TELEPHONE SET

BACKGROUND OF THE INVENTION

This invention relates to an electronic telephone set which comprises first and second connection points for a telephone line, a transmission circuit including a send output stage having a first transistor whose first main electrode is coupled to the first connection point by means of a first resistor and whose second main electrode is coupled to the second connection point, and which set includes a supply circuit for peripheral circuits. This supply circuit has a first output terminal coupled to the first main electrode of the first transistor and has a second transistor whose first main electrode is coupled to the second connection point and whose second main electrode is coupled to the second output terminal of the supply circuit. The circuit includes an operational amplifier whose output is coupled to the gate (control) electrode of the second transistor. The set further includes a first voltage source which is inserted between the first main electrode of the second transistor and a first input of the operational amplifier.

Such an electronic telephone set having a similar supply circuit is known from Philips' Central Application Laboratory Report No. ETT 8707 by F. van Dongen "TEA-1081: A supply IC for Peripheral Circuits in Electronic Telephone Sets", Oct. 1987, Eindhoven, The Netherlands; specifically FIG. A11 on page R 38 of this report. This prior-art supply circuit comprises the commercially available IC TEA1081 and further a capacitor ($C_L$) and resistor ($R_L$) as external components providing, in combination with an internal resistor ($R_S$) of this IC, an inductive input impedance ($L = C_L R_L R_S$) so that the supply circuit can be connected in parallel with the transmission circuit, which transmission circuit may be a commercially available IC of the TEA1060 family. For a description of this IC family cf. Philips Central Application Laboratory Report by P. J. M. Sijbers "TEA1060 family, Versatile Speech/Transmission ICs for Electronic Telephone Sets", Designers' Guide, Jul. 1987, Eindhoven, The Netherlands.

The prior-art supply circuit has the following features. The d.c. current consumed by the supply circuit is not limited so that when powered with specific current supplied by the telephone line, it may reach such a magnitude that the d.c. current through the first transistor becomes too low to realize the desired send level (microphone signal) and also the stabilizing function of the send output stage of the transmission circuit is lost. Alternatively, the d.c. current through the first transistor of the transmission circuit should be approximately 10 mA, so that with minimum telephone line currents (for example, 15 mA) too little input d.c. current (for example, 4 mA) will remain for the supply circuit. The latter current naturally depends not only on the power taken from the output of the supply circuit but also on the a.c. voltage signal on the telephone line and, consequently, may exceed 4 mA at a specific required output power level.

SUMMARY OF THE INVENTION

It is an object of the invention to provide an electronic telephone set that does not have the above negative features and, for this purpose, provides an arrangement of the type mentioned in the opening paragraph which is characterized in that the second main electrode of the first transistor is coupled to the second input of the operational amplifier and, by means of a second resistor, to the second connection point.

As a result of the above measures the supply circuit does not operate as an artificial inductor, but as a power divider. In addition, it produces the send signal.

The advantages realized with the above measures are: augmented supply current for peripheral circuits under any send and transmit conditions, whereas the send output stage of the transmission circuit cannot become inoperative due to a lack of current through the first transistor and the stabilising function is retained and, in addition, with a relatively very low d.c. current level in the first transistor a sufficient signal level on the line can still be realised.

If the TEA1081 is used in the proposed supply circuit, the only basic difference with the prior-art circuit will then be the fact that instead of an external capacitor and resistor only an external resistor (second resistor) will be used.

BRIEF DESCRIPTION OF THE DRAWING

The invention will now be further described with reference to the drawing consisting of a single drawing FIGURE, in which an embodiment of the supply circuit according to the invention is shown.

DESCRIPTION OF THE PREFERRED EMBODIMENTS

The drawing shows a circuit for feeding, from a telephone line (not shown), peripheral circuits (not shown) such as an integrated loudspeaker amplifier circuit, for example, the integrated circuit which is commercially available and designated as TDA7050 and an integrated memory circuit of an electronic telephone set (not shown). The circuit comprises first and second connection points L1, L2 for the telephone line, as well as an integrated transmission circuit IC1, which is shown only very schematically, but which may be the commercially available integrated circuit designated as TEA1064 comprising in its send output stage OS a first transistor T1 whose emitter is coupled as a first main electrode to the first connection point L1 through a first resistor R1 for adjusting the slope of the d.c. current characteristic and whose collector is coupled as the second main electrode to the second connection point L2. The supply circuit has a first output terminal O1 which is coupled to the emitter of the first transistor T1 and further includes a second transistor T2, whose emitter as a first main electrode is coupled either directly or through a third resistor R3 to the second connection point L2 and whose collector as the second main electrode is coupled to the second output terminal O2 of the supply circuit. The supply circuit further includes an operational amplifier A1 whose output is coupled to the base of the second transistor T2 as its gate electrode and a first voltage source V1 which is inserted between the emitter of the second transistor T2 and a first input of the operational amplifier A1. Disregarding any direct link between the emitter of the transistor T2 and the connection point L2, the supply circuit as has been described so far corresponds with the prior-art circuit, whereas the present circuit may comprise an integrated supply circuit IC2 which is shown only partly and diagrammatically, but may be, for example, the commercially available integrated circuit designated as TEA1081.

A characteristic feature of this invention is the fact that in the now supply circuit the collector of the first transistor T1 is coupled to the second input of the operational amplifier A1 and through a second resistor R2 to the second connection point L2.

Using the terminal references of the prior-art integrated circuits mentioned hereinbefore, the positive line terminal LN of the integrated supply circuit IC2 is coupled directly to the positive connection point L2, whereas the positive line terminal LN of the integrated transmission circuit IC1 is coupled to the positive connection point L2 through a resistor R2. The negative line terminal VEE of the integrated transmission circuit IC1 is coupled directly to the negative connection point L1, whereas the negative line terminal VN of the integrated supply circuit IC2 is connected to the IC1 terminal SLPE for adjusting the slope of the d.c. current characteristic, worded differently, coupled to the negative connection point L1 through the resistor R1. Supply terminal VCC is coupled to the positive connection point L2 by means of a resistor R0 and decoupled by means of a capacitor C0. The supply current flowing through resistor R0 is referenced I1. Because of the conjunction with the send output stage OS of the integrated transmission circuit IC1 a microphone M is shown. The gate electrode of transistor T1 receives the processed microphone signal. In addition, transistor T1 is included in a voltage stabilising circuit (not shown). The positive line terminal LN of the integrated transmission circuit IC2 is coupled to the terminal IF of the integrated supply circuit IC2. In view of electromagnetic compatibility a further capacitor may be inserted between the line terminals LN and VEE of IC1. Finally, the output terminal QS of the integrated supply circuit IC2 is coupled to the output O2 of the supply circuit, whereas its terminal O1 is coupled to the negative line terminal VN of IC2 and to the IC1 terminal SLPE for adjusting the slope of the d.c. current characteristic.

A current I2, which is equal to the current I0–I1, flows to the junction of resistor R2 and terminal LN of IC2, the current through resistor R2 being designated as I3 and the current flowing in IC2 as I4. If resistance R3 is equal to 0, current I3 is constant. This is a fact because then, in parallel with resistor R2, the first voltage source V1 and the input voltage of the operational amplifier A1 are connected in series, which input voltage is maintained at 0 because the operational amplifier A1 is included in a feedback loop comprising transistor T2 and resistor R2. If resistance R3 is not equal to 0, across the resistor R3 there will be a voltage drop depending on the current I2 so that the current I3 will not be constant, but will vary with the current I2. In a formula this can be expressed as follows:

$$R3 \cdot I4 + U1 = R2 \cdot I3 \quad (1)$$

$$I2 = I3 + I4 \quad (2)$$

where U1 is the voltage of the voltage source V1 and where I2=I0−I1 which is to say the line current minus the supply current of IC1.

When combining formulas (1) and (2) it follows for currents I3 and I4:

$$I3 = I2 \cdot \frac{R3}{R2 + R3} + \frac{U1}{R2 + R3} \quad (3)$$

-continued
$$I4 = I2 \cdot \frac{R2}{R2 + R3} + \frac{U1}{R2 + R3} \quad (4)$$

As a numerical example, assume I2=20 mA (where I1=1 mA, R3=20 Ohms, R2=500 Ohms and U1=0.5 V). In that case I3=1.7 mA and I4=18.3 mA, which implies that 91.4% of current I2 flows through resistor R3. With I2=40 mA it holds that I4=37.5 mA, so that 93.8% of current I2 flows through resistor R3. Worded in more general terms, the current efficiency will increase with a higher line current I0. Theoretically speaking, this also holds for a reduction of resistance R3. If R3=0, a constant current I3, which is 1 mA in this numerical example, will flow through resistor R2 as has been observed hereinbefore.

Preferably, the integrated circuit IC2 further includes, in addition to voltage source V1, a second voltage source V2 represented in the drawing by means of a dashed line, which source supplies a constant voltage U2 equal to the constant voltage U1 of the first voltage source V1. More specifically, the second voltage source V2 is inserted between the collector of transistor T1 and the input of operational amplifier A1 other than the one to which the first voltage source V1 is connected. As has been observed hereinbefore the direct voltage across the input terminals of the operational amplifier A1 is zero, so that in fact the voltage sources V1 and V2 are arranged in series, while having opposite polarity, as a result of which the net voltage of this series arrangement will be 0 Volts because the two voltages U1 and U2 are equal. With reference to the equations (3) and (4) it will be recongnized that when such a second voltage source V2 is used, the two constant terms [that is to say U1/(R2 +R3)] which are equal are omitted from these formulas. In addition, undesired power distribution owing to variations in voltage U1 are compensated for by variations in U2 of equal tendency, while variations as a result of temperature variations may be considered. This compensation is realised because the two voltage sources V1 and V2 are formed in the same integrated circuit.

Current I3 can be chosen to have a relatively low value, but it should be sufficient for supplying the internal bias current (approximately 0.5 mA) for IC1. If the impedance between the terminals LN and VEE of IC1 is infinite, there will be no a.c. current signal at terminal LN. However, if the above EMC capacitor is required, this will be no longer the case and I3 will have to be approximately 2 mA for a maximum line signal and a maximum signal frequency. With a minimum current level I2 of 14 mA, 12 mA will remain for current I4, which is a considerable improvement with respect to the aforementioned 4 mA in the prior art supply circuit.

Since the d.c. current behaviour of the proposed supply circuit has been described, the a.c. current behaviour will now be discussed. If R3=0, d.c. current I3 will continuously flow through resistor R2 and no a.c. current will flow through transistor T1, but all a.c. current will flow through transistor T2. Worded differently, transistor T2 will borrow the modulation frequency from transistor T1. When R3≠0, the following will hold:

$$R2 \cdot i3 = R3 \cdot i4 \quad (5)$$

which implies that in accordance with the numerical example given hereinbefore only 4% of the a.c. current i2 will flow through transistor T1. Even when resistance R3 is unequal to 0, but much smaller than resistance R2, transistor T2 will actually have borrowed the modulation frequency from transistor T1. The overall send current i=i3=i2 flows through resistor R1, whereas current i3 flows through resistor R2 plus transistor T1, and current i4 through resistor R3 plus transistor T2 plus capacitor C1 which is coupled across output terminals O1, O2.

For the send signals the supply circuit represents a low impedance between terminals LN and SLPE of IC1. For receive signals the send output stage OS of IC1 including the supply circuit is relatively high ohmic, because the voltage at terminal SLPE is not modulated or not substantially modulated. The impedance between terminals LN and VEE of IC1 is formed for all intents and purposes only by resistor R0.

Assuming that resistor R3 is included in the proposed supply circuit the input current I4 can, if the maximum output current of the supply circuit is lower than a specific value, be limited by arranging an electronic zener diode in parallel with resistor R2, which diode limits the maximum voltage drop between terminals LN and IF of IC2. For the zener voltage it holds that it is equal to the sum of voltage U1 of the first voltage source V1 and the maximum permissible voltage drop across resistor R3, which is to say, the product of maximum current I4 and resistance R3. If the zener voltage is attained, part of the available current I4 will flow through the zener diode.

The above electronic zener diode is shown in the drawing by means of a dashed line, whereas resistor R2 comprises the series arrangement of the partial resistors R2a and R2b. A third transistor T3 (which may be a parallel arrangement of various individual transistors) with its base, as the gate electrode, coupled to the junction of the partial resistors R2a and R2b and with the collector and emitter as main electrodes coupled to the free ends of the partial resistors R2a and R2b respectively, or to the second connection point L2 and the terminal LN of IC1, respectively. If the resistor R3 is absent, this solution will be impossible because in that case the current through resistor R2 will be constant and not related to the current I4.

The drawing Figure further represents a so-called tumbler switch circuit, which is required for avoiding distortion when the line signal may drop below the voltage over the output terminals O1, O2, and comprises a switch amplifier A2 and a fourth transistor T4. In that case the direct link between the operational amplifier A1 and the base of transistor T2 is interrupted and the output of operational amplifier A1 is coupled to an input of amplifier A2, whereas the base of transistor T2 is coupled to one of the outputs of amplifier A2. The emitter as a first main electrode of the fourth transistor T4 is coupled to the emitter of transistor T2 whereas the base, as a gate electrode of fourth transistor T4, is coupled to a second output of amplifier A2 and the collector as a second main electrode of fourth transistor T4 is coupled to the terminal VN of IC2. The operation of amplifier A2 is now such that if the voltage at connection point L2 drops below the voltage at output terminal O2, fourth transistor T4 will become conductive and second transistor T2 will block, so that the current from terminal VN and consequently through resistor R1 is drained. The transistors T2 and T4 are controlled such that the sum of the currents through these transistors is constant, and capacitor C1 will provide a continuity of voltage between terminals O1 and O2.

Finally, a voltage stabilizer such as a zener diode DZ limits the output voltage of the supply circuit which, for example, is situated in the range of 3 V to 6 V.

This invention provides not only a novel electronic telephone set, but also novel integrated circuits in which are included, as are in the prior-art circuits, the transistor T2, the first voltage source V1 and the operational amplifier A1, but in which the third resistor R3 is omitted and further the second voltage source V2 may be included, or in which transistor T2, voltage sources V1 and V2 and operational amplifier A1 together with the third resistor R3 are included. When using an integrated circuit without a third resistor R3, the latter may nevertheless be included in the supply circuit but outside of IC2, thus creating the option of using this integrated circuit with a transmission circuit IC1 without the terminal SLPE. Terminal VN of IC2 is then connected to terminal VEE of IC1, whereas it is then necessary to connect a capacitor through second resistor R2. In this case modulation for transmission is effected again by means of transistor T1, but the advantage is that the novel integrated circuit can be used with prior-art transmission circuits.

We claim:

1. An electronic telephone set which comprises first and second connection points for a telephone line, a transmission circuit including in its send output stage a first transistor whose first main electrode is coupled to the first connection point by means of a first resistor and whose second main electrode is coupled to the second connection point, a supply circuit for peripheral circuits, said supply circuit having a first output terminal coupled to the first main electrode of the first transistor and having a second transistor whose first main electrode is coupled to the second connection point and whose second main electrode is coupled to a second output terminal of the supply circuit, which circuit includes an operational amplifier whose output is coupled to a control electrode of the second transistor, a first voltage source connected between the first main electrode of the second transistor and a first input of the operational amplifier, and wherein a second main electrode of the first transistor is coupled to the second input of the operational amplifier and, by means of a second resistor, to the second connection point.

2. An electronic telephone set as claimed in claim 1, further comprising a second voltage source connected between the second main electrode of the first transistor and the second input of the operational amplifier, said voltage source providing the same voltage as the first voltage source, and wherein the voltage sources are connected to the respective inputs of the operational amplifier with the same polarity terminal.

3. An electronic telephone set as claimed in claim 2, further comprising a third resistor connected between the first main electrode of the second transistor and the second connection point.

4. An electronic telephone set as claimed in claim 3 wherein the second resistor comprises a series arrangement of two partial resistors and the supply circuit further includes at least a single third transistor whose control electrode is coupled to a junction between the partial resistors and its main electrodes are connected to respective free ends of the partial resistors.

5. An electronic telephone set as claimed in claim 1, further comprising a third resistor connected between the first main electrode of the second transistor and the second connection point.

6. An electronic telephone set as claimed in claim 1 wherein the supply circuit comprises a switch amplifier and a third transistor, wherein the output of the operational amplifier is coupled to the control electrode of the second transistor by means of the switch amplifier and wherein a first main electrode of the third transistor is coupled to the first main electrode of the second transistor, the second main electrode of the third transistor is coupled to the first main electrode of the first transistor and the control electrode of the third transistor is coupled to an output of the switch amplifier, which selectively drives the second and third transistors in response to a voltage difference between the second connection point and the second output terminal of the supply circuit.

7. An electronic telephone set as claimed in claim 7 wherein a voltage stabiliser is connected to the output terminals of the supply circuit.

8. An electronic telephone set as claimed in claim 7 wherein said second transistor, the first voltage source and the operational amplifier constitute an integrated circuit.

9. An electronic telephone set as claimed in claim 2 further comprising a third resistor connected between the first main electrode of the second transistor and the second connection point, and wherein said second transistor, said first and second voltage sources, said third resistor and said operational amplifier constitute an integrated circuit.

10. An electronic telephone set as claimed in claim 1 wherein the second resistor comprises a series arrangement of two partial resistors and the supply circuit further includes at least a single third transistor whose control electrode is coupled to a junction between the partial resistors and its main electrodes are connected to respective free ends of the partial resistors.

11. An electronic telephone set as claimed in claim 2 wherein the second resistor comprises a series arrangement of two partial resistors and the supply circuit further includes at least a single third transistor whose control electrode is coupled to a junction between the partial resistors and its main electrodes are connected to respective free ends of the partial resistors.

* * * * *